Sept. 24, 1946.  A. J. STONE  2,408,154
QUICK FREEZING APPARATUS FOR FOOD ARTICLES
Filed Feb. 21, 1945  3 Sheets-Sheet 1

INVENTOR
Andrew Jackson Stone

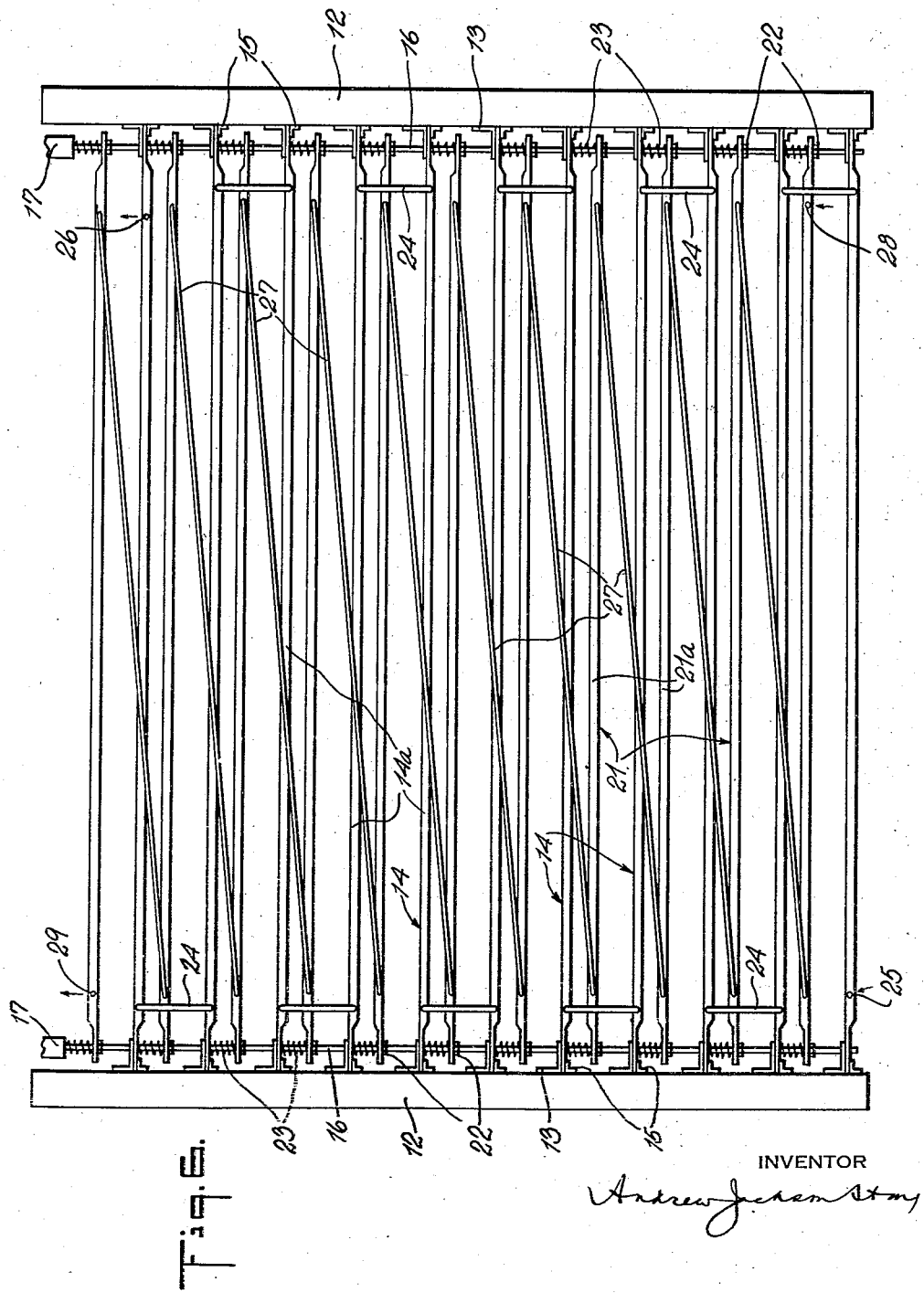

Patented Sept. 24, 1946

2,408,154

UNITED STATES PATENT OFFICE 2,408,154

QUICK-FREEZING APPARATUS FOR FOOD ARTICLES

Andrew J. Stone, New York, N. Y.

Application February 21, 1945, Serial No. 578,969

12 Claims. (Cl. 62—114)

This invention relates to refrigeration and has reference particularly to what is generally known as quick freezing, and the object of the invention is to provide an improved apparatus of very simple and compact construction and very effective and efficient operation.

My invention is illustrated in the accompanying drawings, in which—

Figure 6 is a rear elevational view of the interior structure.

Figure 1:
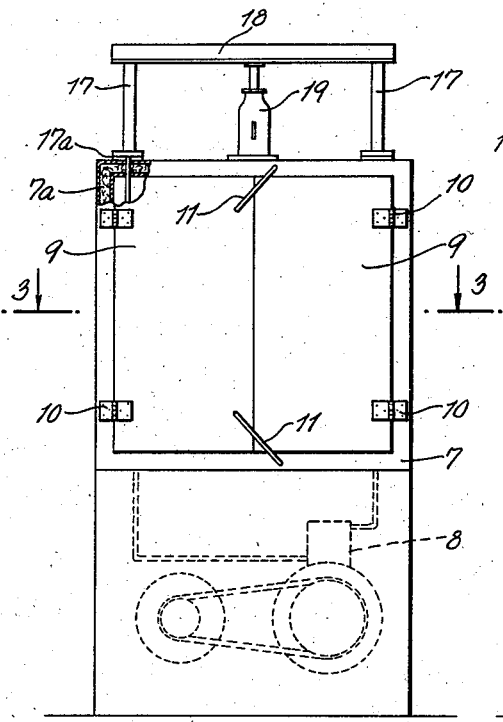
Figure 1 is a front elevational view of the refrigerator.
Figure 2:
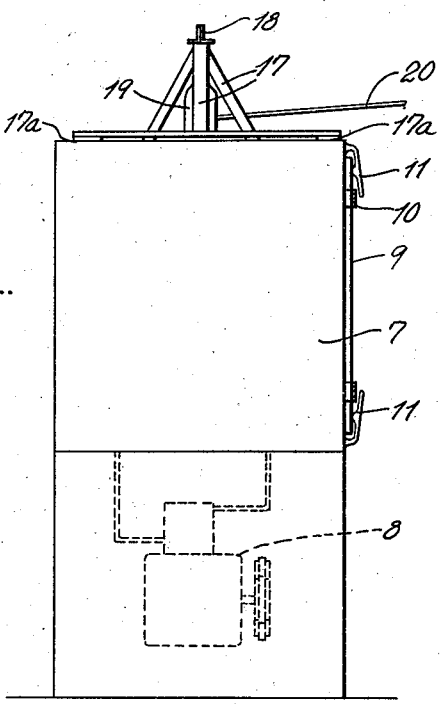
Figure 2 is a side elevational view thereof.

The housing of the plant is shown at 7 in Figures 1 and 2, the motor-compressor unit and the usual appurtenant mechanisms of a refrigerating system being disposed in the lower portion thereof, as indicated at 8 in dotted lines in Figures 1 and 2.

The upper portion of the housing 7 is provided with the doors 9, 9 at the front, these doors being conveniently hinged to the housing at 10, 10 and being adapted to be held closed by means of the hasps 11.

In the upper portion of the housing 7, which is heat insulated as shown at 7a in Figure 1 and which is accessible from the front when the doors 9, 9 are opened, are a series of so-called refrigerating plates, one over the other, half of them being fixed and the other half movable, all in a manner now to be described.

Figure 3:
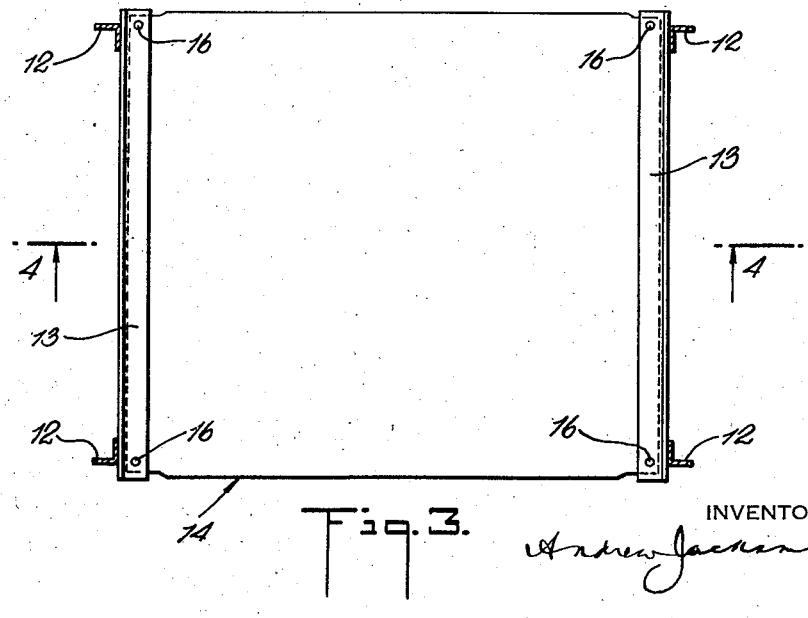
Figure 3 is a horizontal cross-section of the interior structure, taken approximately on the line 3—3 of Figure 1, and looking downwardly.
Figure 4:
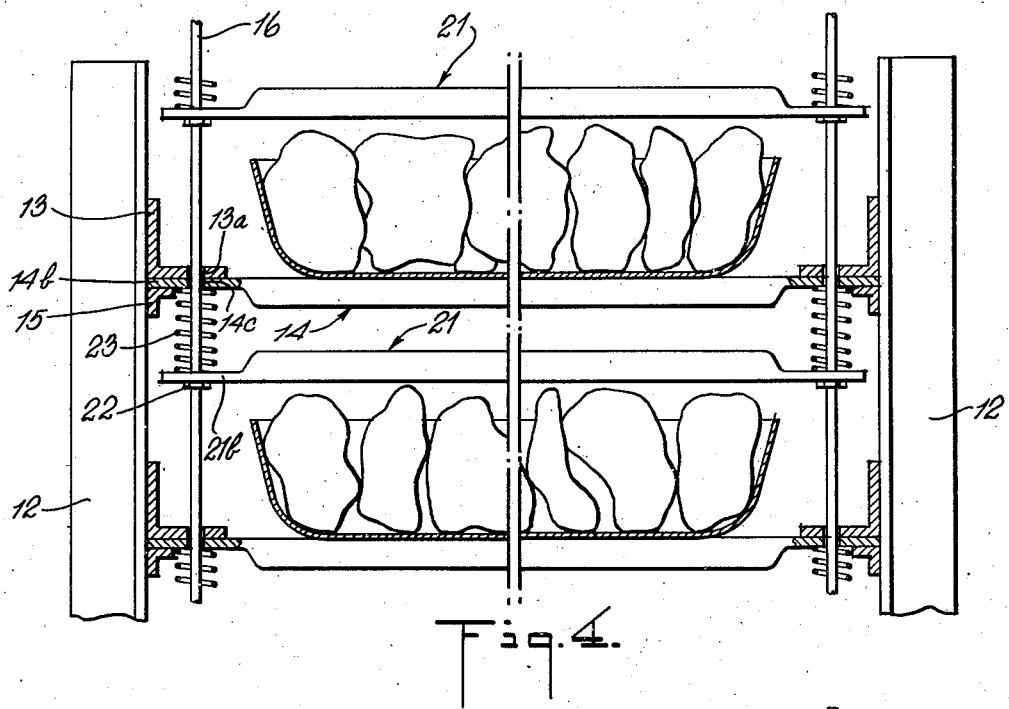
Figure 4 is a front elevational view of the interior structure, parts being illustrated in section.
Figure 5:
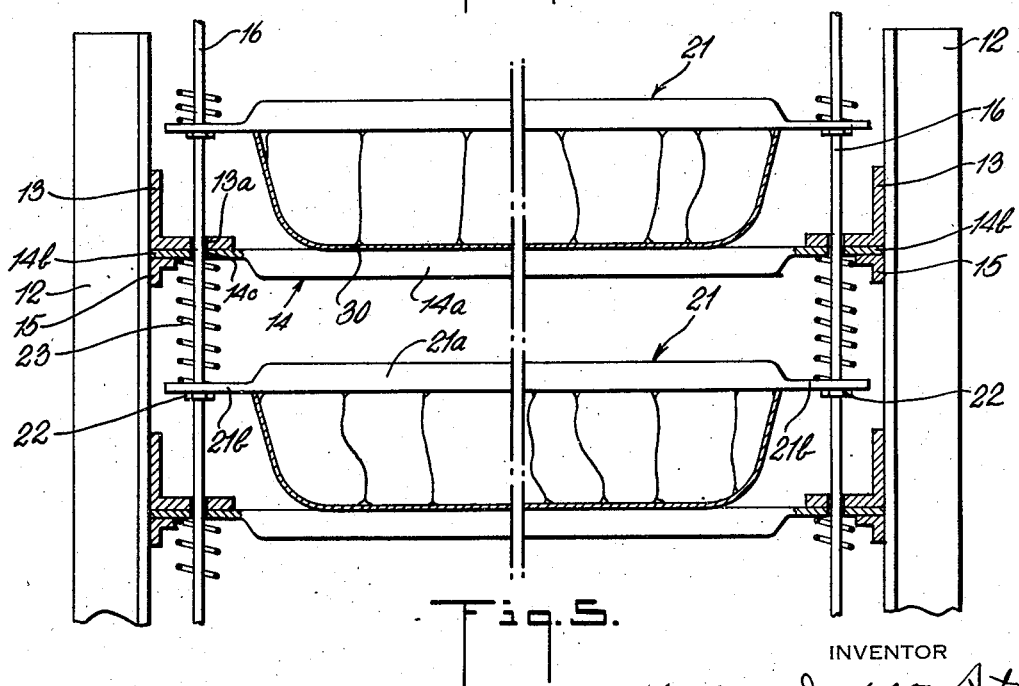
Figure 5 is a view similar to Figure 4, except that certain parts are shown in another position.

As shown in Figures 3, 4 and 5, the supporting structure within the housing 7 comprises the four upright angle bars 12, 12, one at each corner, and horizontal angle bars 13, 13 are secured to these upright angle bars, running from front to back and spaced vertically from each other in the manner of regularly arranged shelves, pairs being in lateral alinement. To each pair of these horizontal angle bars 13, 13 there is secured a stationary refrigerating plate, indicated as a whole at 14, comprising the comparatively enlarged central portion 14a, which forms a refrigerating chamber, and the laterally extending flanges 14b, 14b, secured against the respective horizontal angle bars 13, 13, conveniently by means of small horizontal angle bars 15, 15, attached to the vertical angle bars 12, 12, parallel to the angle bars 13, 13, as clearly shown in Figures 4 and 5.

Passing through openings 13a and 14c, respectively in the horizontal members of the angle bars 13 and the flanges 14b, are vertical rods 16, 16, one at each corner, these rods being vertically movable in a manner now to be described.

The four vertical rods 16, 16 extend upwardly out of the housing 7, in a manner particularly illustrated at the broken-away sectional portion in Figure 1, where they become part of a vertically moving framework 17 having the horizontal cross-bar 18, and lifting mechanism is provided between that cross-bar and the top of the housing. In the instant case, this lifting mechanism is in the form of a lifting jack 19, operated by a hand lever 20. Operation of the hand lever 20 results in the lifting of the framework, with its four downwardly extending rods 16, and the lifting jack 19 is provided with the usual mechanism for release, whereby the framework and its rods are lowered. As shown in Figure 1, a compressible washer 17a, as of rubber, is interposed between the framework 17 and the top of the housing, around each rod 16, in such a manner that, when the framework is in its lowered position, the opening through which the rod passes is effectively packed by the compression of the washer.

The rods 16, 16 support the vertically movable refrigerating plates 21, 21, which are similar to the refrigerating plates 14, 14, comprising the refrigerating chamber 21a and the laterally extending flanges 21b, 21b, one of these movable refrigerating plates being disposed over each of the fixed refrigerating plates. The rods 16, 16 pass through openings in the flanges 21b, 21b, but, in this instance, they are engaged to the flanges 21b, 21b, at the bottoms thereof, by means of cross pins or the nuts 22, 22. Surrounding the rods 16, 16, and lying between the flanges 21b and the flanges 14b above them, are the equalizing springs 23, urging their respective movable refrigerating plates downwardly towards the companion fixed refrigerating plates, all as clearly shown in Figures 4 and 5. When the vertically movable framework is in its lowermost position, as shown in Figures 1 and 2, the movable refrigerating plates occupy the position shown in Figure 5, and when it is in its upper position, the movable refrigerating plates occupy the position shown in Figure 4.

Reference is now made to Figure 6.

The fixed refrigerating chambers 14a, 14a are connected in series, at alternately opposite ends, by means of tubing 24, 24, the inlet for this fixed plate system being at 25 and the outlet being at 26.

The movable refrigerating chambers 21a, 21a are also connected in series, in this instance by means of the flexible hose 27, 27, as clearly shown in Figure 6, the inlet for this movable refrigerating plate system being at 28 and the outlet therefor being at 29. The refrigerant inlets and outlets are appropriately connected with the refrigerating plant in the lower portion of the housing 7, and, if desired, intermediate connections may be provided in parallel in order more evenly to distribute the refrigerant.

Articles to be frozen are to be disposed between the members of each pair of refrigerating plates and are to be held in contact therewith during freezing. Conveniently, shallow containers 30 may be used for these articles, and their introduction into the refrigerator is shown in Figure 4, the movable refrigerating plates being held in upward position for this purpose. In natural state, the foodstuff to be frozen extends beyond the rim of the container 30. With the foodstuffs thus introduced, the movable framework is permitted to lower, so that the movable refrigerating plates are permitted to come down upon the top of the foodstuffs to be frozen, the resulting condition being as illustrated in Figure 5. When the foodstuffs have been frozen, the lifting jack is again operated to raise the movable framework, and all the movable refrigerating plates, and the frozen foodstuffs are then removed.

I claim:

1. In a refrigerating apparatus, a housing, a stationary plate in said housing providing a refrigerant chamber, a movable plate associated therewith and providing a complementary refrigerant chamber, springs urging said movable plate toward said stationary plate, and means for moving said movable plate away from said stationary plate.

2. In a refrigerating apparatus, a housing, a series of stationary refrigerant chamber plates mounted horizontally in said housing one above the other, a complementary refrigerant chamber plate mounted parallel to each said stationary plate and movable toward and away from the same, springs urging said complementary plates toward said stationary plates, and manual means for moving said complementary plates away from said stationary plates.

3. In a refrigerating apparatus, a housing, mechanical refrigeration means in said housing, a stationary plate in said housing providing a refrigerant chamber, a movable plate associated with said stationary plate and providing a complementary refrigerant chamber, springs urging said movable plate toward said stationary plate, and means outside said housing for moving said movable plate away from said stationary plate.

4. In a refrigerating apparatus, a housing, a series of stationary refrigerant chamber plates mounted horizontally in said housing one above the other, a complementary refrigerant chamber plate mounted parallel to each said stationary plate and movable toward and away from the same, springs urging said complementary plates toward said stationary plates, manual means for moving said complementary plates away from said stationary plates, mechanical refrigerating means in said housing, and connections whereby said last-named means circulate a refrigerant through said chambers.

5. In a refrigerating apparatus, a housing, mechanical refrigerating means disposed in the lower portion of said housing, a series of stationary refrigerant chamber plates mounted horizontally in said housing one above the other, a complementary refrigerant chamber plate mounted above and parallel to each said stationary plate and movable toward and away from the same, springs urging said complementary plates toward said stationary plates, means for carrying all of said complementary plates, said means extending through the top of said housing, and means on top of said housing for raising said carrying means simultaneously to lift all of said complementary plates.

6. In a refrigerating apparatus, a housing, mechanical refrigerating means disposed in the lower portion of said housing, upright supporting members in said housing, a series of refrigerant chamber plates secured to said supporting members horizontally one above the other, a complementary refrigerant chamber plate above and parallel to each said stationary plate and movable toward and away from the same, springs urging said complementary plates toward said stationary plates, means for engaging all of said complementary plates, said means extending through the top of said housing, and means on top of said housing for raising said engaging means simultaneously to lift all of said complementary plates.

7. In a refrigerating apparatus, a housing, a series of stationary refrigerant chamber plates mounted horizontally in said housing one above the other, a complementary refrigerant chamber plate mounted parallel to each said stationary plate and movable toward and away from the same, springs urging said complementary plates toward said stationary plates, manual means for moving said complementary plates away from said stationary plates, mechanical refrigerating means in said housing, and connections whereby said last-named means circulate a refrigerant in parallel through said stationary and complementary chambers respectively.

8. In a refrigerating apparatus, a housing, a series of stationary refrigerant chamber plates mounted horizontally in said housing one above the other, a complementary refrigerant chamber plate mounted parallel to each said stationary plate and movable toward and away from the same, springs urging said complementary plates toward said stationary plates, manual means for simultaneously moving all of said complementary plates away from their companion stationary plates, mechanical refrigerating means in said housing, and connections whereby said last-named means circulate a refrigerant through said chambers.

9. In a refrigerating apparatus, a housing, mechanical refrigerating means disposed in the lower portion of said housing, a series of stationary refrigerant chamber plates mounted horizontally in said housing one above the other, a complementary refrigerant chamber plate mounted above and parallel to each said stationary plate and movable toward and away from the same, springs urging said complementary plates toward said stationary plates, means for carrying all of said complementary plates, said means extending through the top of said housing, means for packing the same, and means on top of said housing for raising said carrying means simultaneously to lift all of said complementary plates.

10. In refrigerating apparatus, a housing, mechanical refrigerating means disposed in the lower portion of said housing, upright supporting members in said housing, a series of refrigerant chamber plates secured to said supporting members horizontally one above the other, a complementary refrigerant chamber plate above and parallel to each said stationary plate and movable toward and away from the same, springs urging said complementary plates toward said stationary plates, means for engaging all of said complementary plates, said means extending through openings in the top of said housing, means for packing said openings when said complementary refrigerant chamber plates are in lowered position, and means on top of said housing for raising said engaging means simultaneously to lift all of said complementary plates.

11. In a refrigerating apparatus, a housing, a series of stationary refrigerant chamber plates mounted horizontally in said housing one above the other, a complementary refrigerant chamber plate mounted parallel to each said stationary plate and movable toward and away from the same, said complementary plates being mounted on vertically movable rods, springs urging said complementary plates toward said stationary plates, external manual means for moving said complementary plates away from said stationary plates by lifting said rods, mechanical refrigerating means in said housing, and connections whereby said last-named means circulate a refrigerant in parallel through said stationary and complementary chambers respectively.

12. In a freezing apparatus, the combination of a frame, a plurality of pairs of hollow plates positioned within said frame, the pairs being superimposed one above another, one plate in each pair being mounted in fixed relation to the frame and the other plate in each pair being movable away from the corresponding fixed plate thereof to permit articles to be introduced therebetween, yieldable means urging each movable plate toward its fixed plate to cause the plates of each pair to exert pressure on articles interposed between them, vertically reciprocable rods slidably secured to said frame, means connecting the rods with the movable plates, means for moving the rods conjointly to increase the distance between each movable plate and the corresponding fixed plate, means for supplying all of the fixed plates with refrigerant and means for supplying all of the movable plates with refrigerant.

A. J. STONE.